(12) United States Patent
Wu

(10) Patent No.: US 6,698,882 B1
(45) Date of Patent: Mar. 2, 2004

(54) ADJUSTABLE EYEGLASSES FOR ADJUSTING INTEROCULAR DISTANCE

(76) Inventor: Hurng-Shiarng Wu, P.O.Box 24-108, Taipei (TW)

( * ) Notice: Subject to any disclaimer, the term of this patent is extended or adjusted under 35 U.S.C. 154(b) by 0 days.

(21) Appl. No.: 10/348,223

(22) Filed: Jan. 22, 2003

(51) Int. Cl.⁷ .................................................. G02C 5/04
(52) U.S. Cl. ........................................ 351/128; 351/124
(58) Field of Search ................................ 351/124, 128, 351/41

(56) References Cited

U.S. PATENT DOCUMENTS 4,768,872 A * 9/1988 Fraselle et al. ............. 351/118

* cited by examiner

*Primary Examiner*—Hung X. Dang
(74) *Attorney, Agent, or Firm*—Troxell Law Office PLLC

(57) ABSTRACT

The present invention relates to a pair of adjustable eyeglasses for adjusting the interocular distance, in which an integrally connected frame between the two eyeglass frames of regular eyeglasses is designed in a way that the distance between the two eyeglass frames of the assembly are adjustable or replaceable. After the eyeglass frame is manufactured and shipped out from the factory, the user can quickly and easily adjust the interocular distance and assemble the eyeglasses. The present invention can reduce the manufacturer's inventory, fit the mass production requirement, and greatly reduce the cost.

1 Claim, 2 Drawing Sheets

ADJUSTABLE EYEGLASSES FOR ADJUSTING INTEROCULAR DISTANCE

BACKGROUND OF THE INVENTION

1. Field of the Invention

The present invention relates to a pair of adjustable eyeglasses for adjusting interocular distance and solves the problem of the integral structure of a regular conventional eyeglass frame that requires different sizes for the interocular distance for different users.

2. Description of the Related Art

A pair of conventional glasses generally has an integral eyeglass frame structure, and thus the manufacturers have to prepare different sizes of frames to fit the user's interocular distance. The conventional eyeglass frame is not suitable for mass production and consequently results in a high cost.

In general, the price of eyeglasses is high and the main factor of such high price not only lies on the material cost of the eyeglasses, but is affected mostly by the basic expenses and indirect expenditures such as the rent, advertising, electric bill, depreciation of instruments, and salary, etc. Strictly speaking, consumers do not just pay for the eyeglasses only, but also share the basic expenses of the store. As a result, the consumers have to pay for a high price, while the eyeglass company can gain a basic profit only. Most of the eyeglasses companies belong to the secondary manufacturing industry. The reason for this loss-loss situation for manufacturers and consumers resides on the fact that the conventional eyeglass frame cannot be manufactured in mass production. The advantages of mass production include its mechanical operation, high efficiency, mass-produced products sharing the equipment resources, and sharing the unit cost. There are plenty of examples, such as the common personal computer, television, mobile phone, which tells us that the result of mass production can definitely create the effects for lower price and higher quality. However, there are some difficulties to manufacture eyeglasses in mass production Besides paying attention to the degree of farsightedness, nearsightedness, and astigmatism of both eyes, fitting the interocular distance between the centers of two eyeglasses is also a very important parameter for making a pair of eyeglasses These parameters make the mass production for various eyeglasses products more complicated and even impossible. Such issue has to be studied and improved.

In view of the above description about the shortcomings of the prior art, the present inventor based on years of experience accumulated from the engagement in the eyeglasses manufacturing industry conducted extensive research to resolve the aforementioned shortcomings and invented the adjustable eyeglasses for interocular distances in accordance with the present invention.

The present invention relates to a pair of adjustable eyeglasses focusing on the problem of the structure of an integral frame of the conventional eyeglasses. The manufacturers have to prepare different sizes of the frame to fit user's interocular distance, and thus the conventional eyeglasses are not suitable for mass production and resulting in a high cost Therefore an adjustable frame or replaceable assembly is provided, such that the interocular distance of the eyeglasses so produced and shipped out from the factory can be adjusted or replaced in a simple and quick manner in order to reduce the inventory for manufacturing and selling. Such arrangement is suitable for mass production, and thus significantly lowering the marketing cost and attaining the cost-effective purpose.

SUMMARY OF THE INVENTION

The primary objective of the present invention is to provide a pair of adjustable eyeglasses for adjusting the interocular distance, and to emphasize on the parameter of eyeglasses: interocular distance, so that the eyeglasses can be adjusted after shipping out from the factory, and manufactured in mass production to reduce the types of products. The present invention further puts the mass production into practice. As to the planning for the degrees is another subject, which requires the consultation and guidance of medical doctors or professionals. It is noteworthy that a pair of adjustable eyeglasses has the benefit of quickly and conveniently assembling a pair of eyeglasses once the required two pieces of eyeglasses and a frame have been chosen, and thus reducing the inventory and variety of the eyeglasses and frames. For example, if an eyeglass of 300 degrees is chosen for the left eye and an eyeglass of 350 degrees for the right eye, and after the interocular distance has been adjusted and assembled properly, a pair of eyeglasses is ready. Such arrangement can substitute the time-consuming and laborious procedures of selecting the eyeglass, cutting and polishing the eyeglass, assembling the eyeglass, and then adjusting the eyeglass according to the interocular distance of the user in an easy and quick manner.

To make it easier for our examiner to understand the objective of the invention, its structure, innovative features, and performance, we use a preferred embodiment in conjunction with the attached drawings for the detailed description of the invention.

DETAILED DESCRIPTION OF THE PREFERRED EMBODIMENTS

Figure 1:
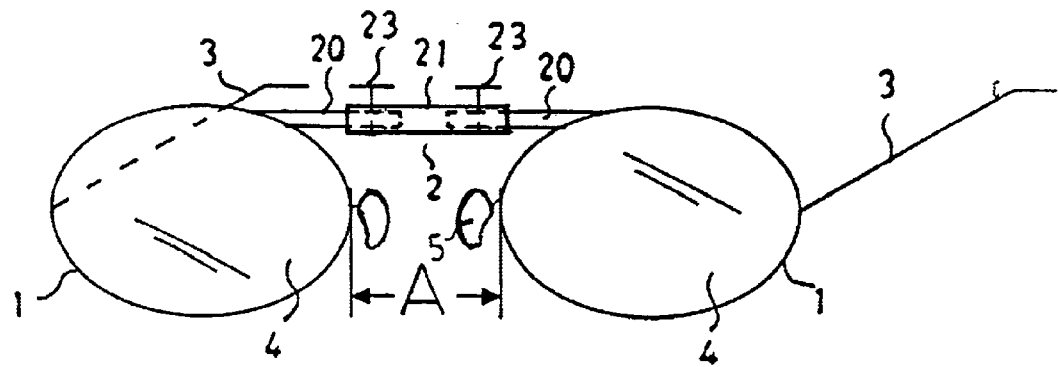
FIG. 1 is a perspective diagram of a preferred embodiment of the present invention.

Please refer to the figures for the present invention, which is comprised of an eyeglass frame 1, a connecting frame 2, and an earpiece 3; wherein the eyeglass frame for holding the eyeglass 4 in the position on the left and right sides of the eyeglass frame 1; the earpiece 3 is a rod frame connected to the outer side of the eyeglass frame 1 to fit the wearer's ear; and the connecting frame 2 is a structure connected to the inner side of the eyeglass frame 1 for coupling to the connecting frame 2 and adjusting the distance between the eyes. Of course, a soft support assembly used as a bridge 5 to be placed upon the wearer's nose to couple with the connecting frame 2 onto the eyeglass frame 1. The connecting frame 2 could be an independent unit, and connected or mounted onto the inner side of the eyeglass frame 1 by inlaying or other coupling methods.

Figure 2:
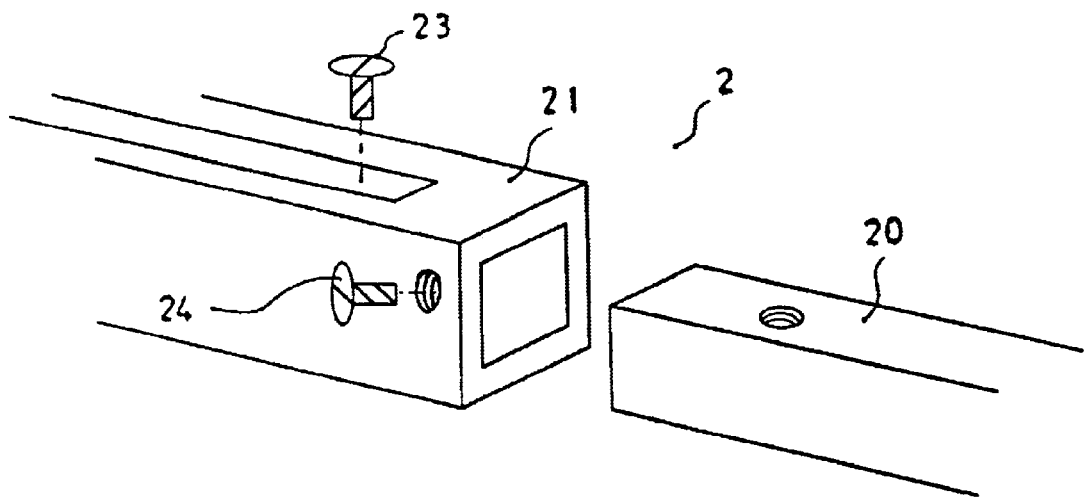
FIG. 2 is an illustrative diagram of the disassembled parts of the structure of a preferred embodiment of the present invention.
Figure 3:
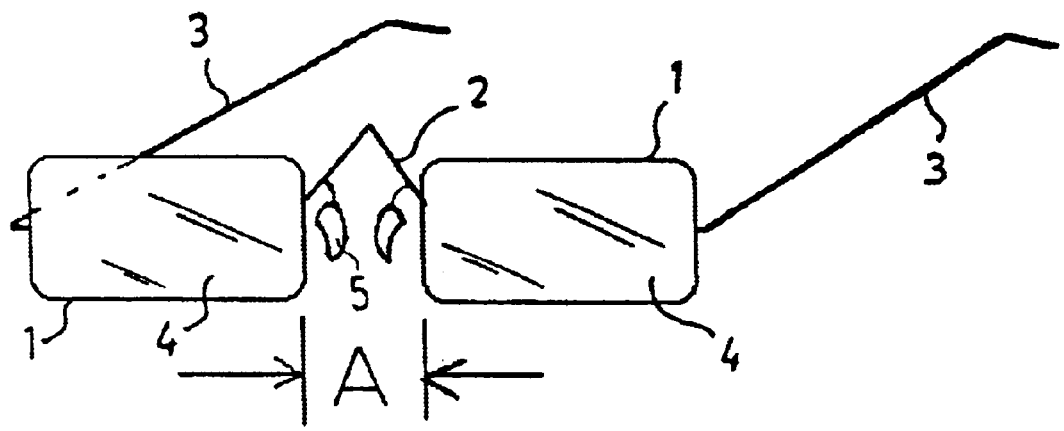
FIG. 3 is a perspective diagram of another preferred embodiment of the present invention.

In the structure of these embodiments, a linear shape is the easiest one for the implementation In FIGS. 1 and 2, the eyeglass frame 1 having a left and right eyeglasses 4 with their inner sides is connected to a polygonal rod 20 of sufficient strength, and a screw hole is disposed on an appropriate position on the rod 20, and the two pieces of prescribed eyeglasses 4 are secured onto the eyeglass frame 1; a polygonal hollow sleeve 21 couples its ends with the rod 20 of the eyeglass frame 1. After the rod 20 and sleeve 21 are connected, they are slid to an appropriate position according to the wearer's interocular distance. The distance between the centers of both eyeglasses is adjusted properly, and then a screw 23 is used to secure each of the eyeglasses. If the design incorporates a polygonal eyeglass, then the left and right eyeglass frames 1 will not be twisted or deformed easily. Further, a cut groove remains on the sleeve 21 to keep the sleeve 21 and the rod 20 in a close contact. After the rod 20 is connected and secured into a position by a screw 23, another screw 24 is used to further secure the sleeve 21 and the rod 20 for keeping them in close contact. After the distance is confirmed, then a permanent fixing method such as gluing, supersonic, soldering, etc. can be performed depending on the material used for the sleeve 21 and the rod 20. In order to beautify the appearance of the sleeve 21, a circular or other ornamental shape can be used, screws can be secured from the bottom, and a small lid can be added. In general, the interocular distance of an adult falls in the range of 55 mm~75 mm, and the length of the sleeve 21 may have two sizes, and the travel of each size is below 10 mm. Therefore, the adjustment of the distance will not be limited by the length of the sleeve 21. In FIG. 3, the connecting frame 2 is an independent unit, and has a different interval A, so that the wearer can choose the connecting frame 2 with an appropriate interval A, and the inner sides of the eyeglass frame 1 can be connected by inlaying method The structure and device of the present invention have never been disclosed in the market and publication. In addition to reducing the manufacturing and marketing inventory, the present invention is also suitable for mass production and thus significantly reducing the manufacturing and marketing cost. The present invention obviously improves the performance and fully complies with the patentability.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An adjustable eyeglass frame for adjusting an interocular distance comprising:
  a) two eyeglasses;
  b) two eyeglass frames, each eyeglass frame connected to one of the two eyeglasses;
  c) a bridge positioned between the two eyeglass frames;
  d) two earpieces, one earpiece connected to each of the two eyeglass frames; and
  e) a connecting frame extending between the two eyeglass frames and selectively fixing the distance between the two eyeglass frames, wherein the distance between the two eyeglass frames is changeable, the connecting frame including:
    i) two polygonal rods, a first end of each of the two polygonal rods connected to one of the two eyeglass frames;
    ii) a polygonal sleeve, a second end of each of the two polygonal rods inserted into opposing ends of the polygonal sleeve;
    iii) a slot in the polygonal sleeve;
    iv) two screws, each of the two screws being adjustably connected to one of the two polygonal rods through the slot in the polygonal sleeve, wherein each screw is moveable between a locked position for fixing the distance between the eyeglass frames and an slidable position for adjusting the distance between the eyeglass frames; and
    v) two securing screws, each securing screw securing one of the two polygonal rods to the polygonal sleeve.

\* \* \* \* \*